United States Patent
Tetsuka

(10) Patent No.: US 8,723,659 B2
(45) Date of Patent: May 13, 2014

(54) BICYCLE GEAR SHIFT INDICATOR

(75) Inventor: Toshio Tetsuka, Hyogo (JP)

(73) Assignee: Shimano Inc., Osaka (JP)

( * ) Notice: Subject to any disclaimer, the term of this patent is extended or adjusted under 35 U.S.C. 154(b) by 8 days.

(21) Appl. No.: 13/545,538

(22) Filed: Jul. 10, 2012

(65) Prior Publication Data

US 2014/0015659 A1  Jan. 16, 2014

(51) Int. Cl.
*B62J 3/00* (2006.01)
*F16H 61/00* (2006.01)
*B62M 9/12* (2006.01)

(52) U.S. Cl.
USPC ............................................ 340/432; 474/70

(58) Field of Classification Search
USPC .......... 340/432, 438, 439; 280/236, 238, 260, 280/261; 74/500.5, 501.5 R, 502.2; 474/70, 474/71, 110, 116, 126, 80
See application file for complete search history.

(56) References Cited

U.S. PATENT DOCUMENTS

| | | | |
|---|---|---|---|
| 4,490,127 A | 12/1984 | Matsumoto et al. | |
| 4,642,606 A | 2/1987 | Tsuyama | |
| 4,887,249 A | 12/1989 | Thinesen | |
| 5,266,065 A * | 11/1993 | Ancarani Restelli | 474/78 |
| 5,335,188 A | 8/1994 | Brisson | |
| 5,551,315 A * | 9/1996 | Pikoulas | 74/502.2 |
| 5,644,511 A * | 7/1997 | McWhorter | 702/148 |
| 5,865,454 A | 2/1999 | Campagnolo | |
| 5,970,816 A | 10/1999 | Savard | |
| 6,575,583 B2 * | 6/2003 | Suzuki et al. | 362/23 |
| 6,774,771 B2 | 8/2004 | Takeda | |
| 7,306,531 B2 | 12/2007 | Ichida et al. | |
| 7,373,232 B2 | 5/2008 | Guderzo | |
| 7,399,244 B2 * | 7/2008 | Takebayashi et al. | 474/70 |
| 7,854,180 B2 | 12/2010 | Tetsuka | |
| 7,900,946 B2 * | 3/2011 | Hara et al. | 280/260 |
| 7,947,914 B2 | 5/2011 | Takebayashi et al. | |
| 8,137,223 B2 | 3/2012 | Watarai et al. | |
| 2004/0254650 A1 | 12/2004 | Campagnolo et al. | |
| 2008/0210043 A1 | 9/2008 | De Perini | |
| 2010/0244401 A1 | 9/2010 | Hara et al. | |

FOREIGN PATENT DOCUMENTS

| | | | |
|---|---|---|---|
| EP | 1384659 A2 | 1/2004 |
| EP | 1526069 A2 | 4/2005 |
| EP | 1932754 A2 | 6/2008 |
| JP | 59-130741 A | 7/1984 |
| JP | 59-130741 A | 7/1984 |
| JP | 63-012839 A | 1/1988 |
| JP | 63-12839 A | 1/1988 |
| JP | 64-012924 A | 1/1989 |
| JP | 64-12924 A | 1/1989 |
| JP | 08-332990 A | 12/1996 |

(Continued)

OTHER PUBLICATIONS

U.S. Appl. No. 13/611,790, filed Sep. 12, 2012.

*Primary Examiner* — Van T. Trieu
(74) *Attorney, Agent, or Firm* — Global IP Counselors

(57) ABSTRACT

A bicycle gear shift indicator comprises a shift sensor and a controller. The shift sensor configured detects a shifting operation of a shifter. The controller is operatively coupled to the shift sensor to determine a continuous shifting operation of the shifter based on a gear shift selection signal from the shift sensor. Furthermore, the controller is configured to operate a notification device that generates a shift notification corresponding to one or more gear shifts based on a continuous operation time of the shifter.

19 Claims, 11 Drawing Sheets

(56) References Cited

\* cited by examiner

FOREIGN PATENT DOCUMENTS

| JP | 09-020153 | A | 1/1997 |
| JP | 9-20153 | A | 1/1997 |
| JP | 3602292 | B2 | 10/2004 |

| UP SHIFT OPERATION | SCALE | DOWN SHIFT OPERATION | SCALE |
|---|---|---|---|
| FIRST UP SHIFT | DO | FIRST DOWN SHIFT | DO |
| SECOND UP SHIFT | RE | SECOND DOWN SHIFT | TI |
| THIRD UP SHIFT | MI | THIRD DOWN SHIFT | RA |
| FOURTH UP SHIFT | FA | FOURTH DOWN SHIFT | SO |
| FIFTH UP SHIFT | SO | FIFTH DOWN SHIFT | FA |
| • | • | • | • |
| • | • | • | • |
| • | • | • | • |

FIG. 11

| SHIFT POSITION | 1 | 2 | ③ | 4 | 5 | 6 | 7 | ⑧ | 9 | 10 |
|---|---|---|---|---|---|---|---|---|---|---|
| UPSHIFT SOUND | | | ○ DO | RE | MI | | | ○ DO | RE | MI |

FIG. 12

| SHIFT POSITION | SCALE |
|---|---|
| 1 ⇔ 2 | DO |
| 2 ⇔ 3 | RE |
| 3 ⇔ 4 | MI |
| 4 ⇔ 5 | FA |
| 5 ⇔ 6 | SO |
| • | • |
| • | • |
| • | • |

FIG. 13

| SHIFT POSITION | 1 | 2 | 3 | 4 | 5 | 6 | 7 | 8 | 9 | 10 |
|---|---|---|---|---|---|---|---|---|---|---|
| SOUND | | DO | RE | MI | FA | SO | RA | SI | DO | RE |

FIG. 14

BICYCLE GEAR SHIFT INDICATOR

BACKGROUND

1. Field of the Invention

This invention generally relates to a bicycle gear shift indicator. More specifically, the present invention relates to a bicycle gear shift indicator including a notification device that generates a shift notification corresponding to one or more gear shifts based on a continuous operation time of the shifter.

2. Background Information

In recent years, some bicycles are provided with electrically adjustable derailleurs that are controlled by shifting mechanisms. When a shift lever of the shift mechanism is actuated, a signal is sent to the derailleur to cause the derailleur to shift the bicycle chain to the designated gear. The shift mechanism can provide an indication of the shifting operation.

SUMMARY

In view of the above, it will be apparent to those skilled in the art from this disclosure that there exists a need for an improved gear shift indicator. This invention addresses this need in the art as well as other needs, which will become apparent to those skilled in the art from this disclosure.

In view of the state of the known technology, a bicycle gear shift indicator is provided that comprises a shift sensor and a controller. The shift sensor configured detects a shifting operation of a shifter. The controller is operatively coupled to the shift sensor to determine a continuous shifting operation of the shifter based on a gear shift selection signal from the shift sensor. Furthermore, the controller is configured to operate a notification device that generates a shift notification corresponding to one or more gear shifts based on a continuous operation time of the shifter.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure:

FIG. 11 is an exemplary table showing sounds output by the bicycle gear shift indicator;

FIG. 12 is another exemplary table showing sounds output by the bicycle gear shift indicator;

FIG. 13 is a further exemplary table showing sounds output by the bicycle gear shift indicator;

FIG. 14 is still another exemplary table showing sounds output by the bicycle gear shift indicator;

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
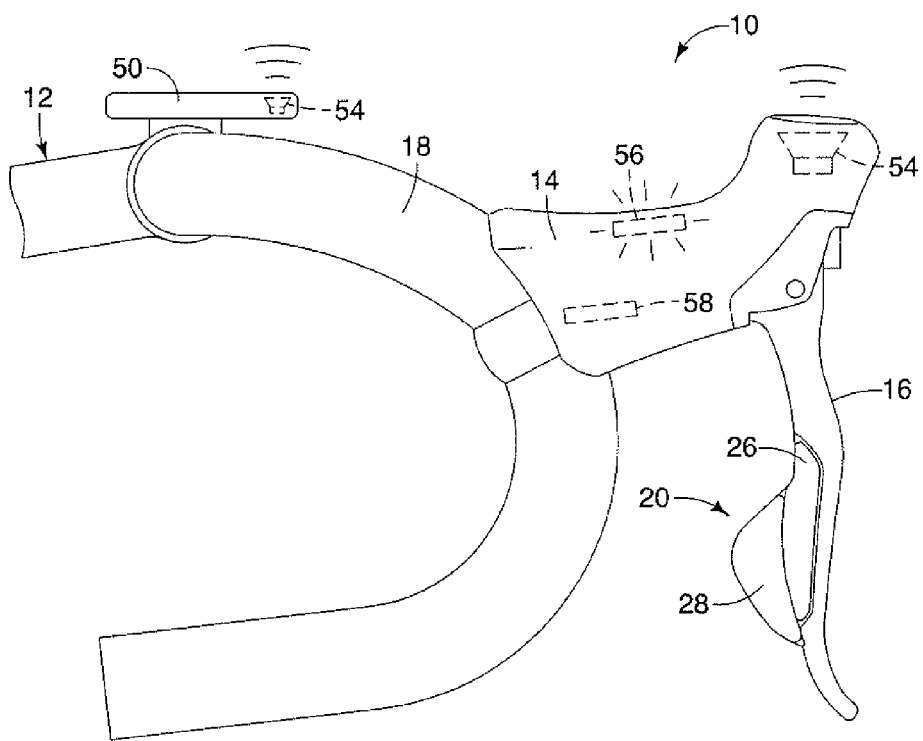
FIG. 1 is a side view of a bicycle handlebar and brake assembly including a bicycle gear shift indicator according to a disclosed embodiment.
Figure 2:
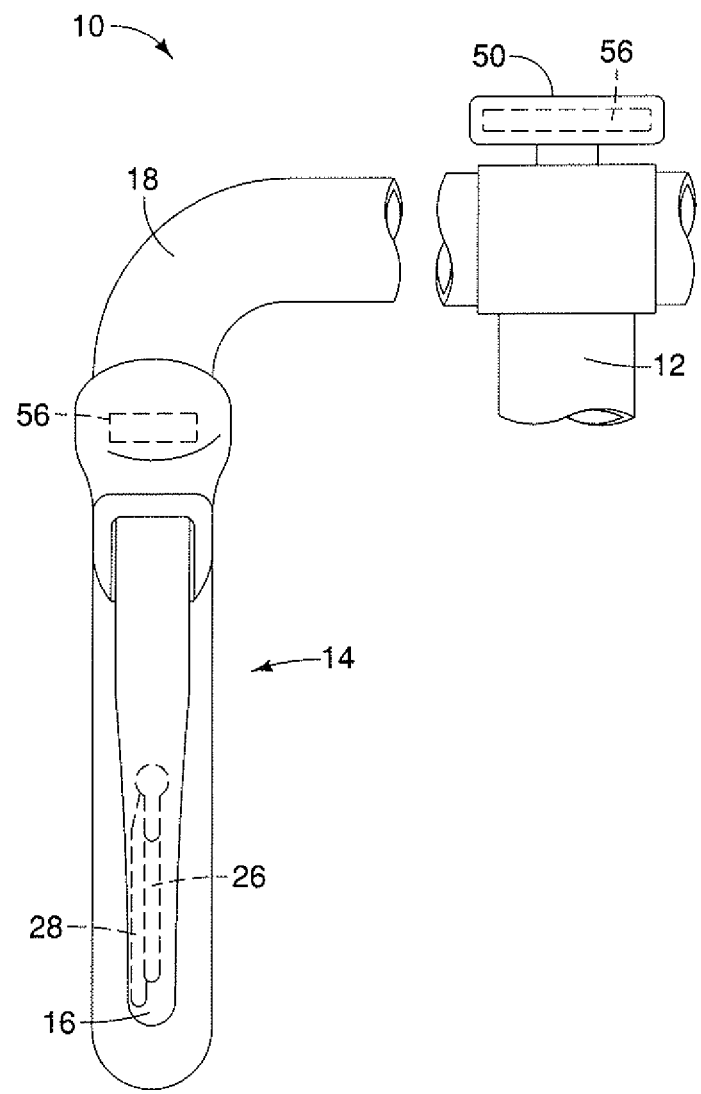
FIG. 2 is a front view of the bicycle handlebar and brake assembly shown in FIG. 1.
Figure 3:
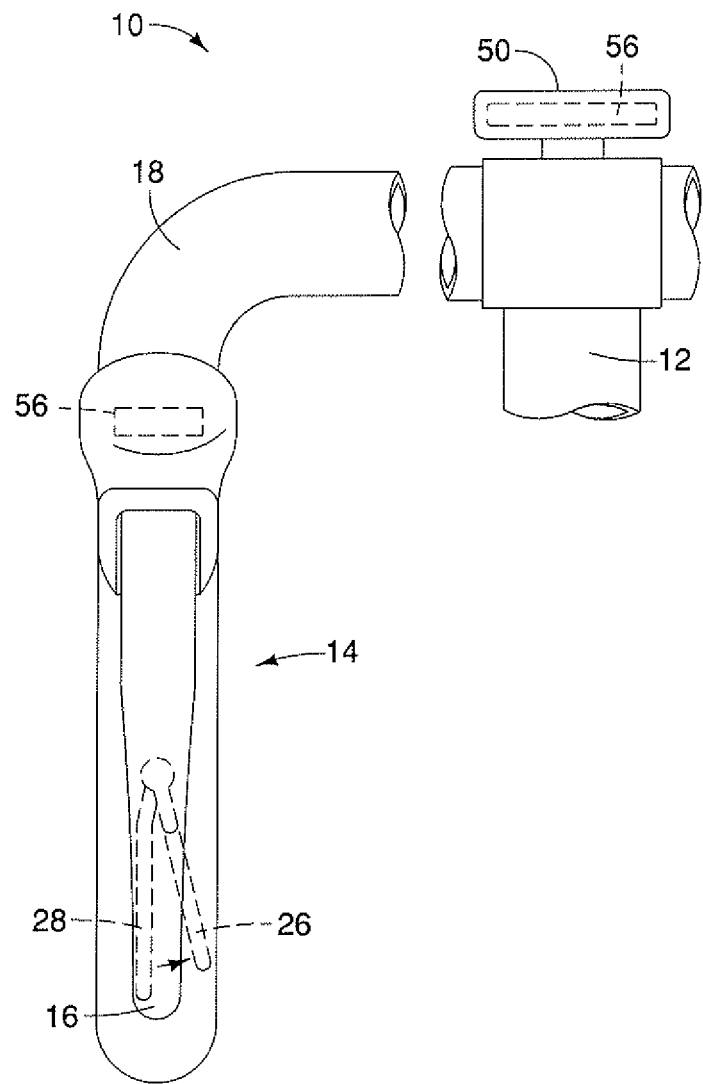
FIG. 3 is another front view of the bicycle handlebar and brake assembly shown in FIG. 1 with a shift level in a shift position.

Referring initially to FIGS. 1 through 3, a bicycle gear shift indicator 10 of a bicycle 12 is illustrated in accordance with a disclosed embodiment. The bicycle 12 has an electrically powered wireless bicycle control system that includes brake assemblies 14 each having a brake handle (lever) 16. The brake assemblies 14 are mounted to the right and left sides of a handlebar 18 as shown. For exemplary purposes, only a right brake assembly 14 is illustrated. However, the left brake assembly 14 is a substantially identical mirror image of the right brake assembly 14 and includes all of the features of the right brake assembly 14 discussed herein. The right brake assembly 16 can control a front brake (not shown) and the left brake assembly 14 can control a rear brake (not shown), or vice-versa, as understood in the art.

Each brake assembly 14 can include a shifter assembly 20 as understood in the art. For example, the right brake assembly 14 can include a shifter assembly 20 that can be configured as a rear shifter which controls a rear derailleur 22 (see FIGS. 4 and 5). The left brake assembly 14 can include a shifter assembly 20 that can be configured as a front shifter which controls a front derailleur 24 (see FIGS. 4 and 5). Naturally, the shifter assembly 20 of the right brake assembly 14 can be configured as the front shifter and the shift assembly 20 of the left brake assembly 14 can be configured as the rear shifter, or vice-versa.

The shifter assemblies 20 can control the front and rear derailleurs 22 and 24 in any conventional manner as understood in the art. For example, the front and rear shifter assemblies 20 can each include shift levers (shifters) 26 and 28 for performing upshifting and downshifting as understood in the art. Each shift assembly 20 can further include a wireless transmitter (not shown) that communicates with respective wireless receivers (not shown) in the front and rear derailleurs 22 and 24 to control the shifting operations of the front and rear derailleurs 22 and 24. Alternatively, the shift assemblies 20 can communicate with the front and rear derailleurs 22 and 24 via electrical cables, mechanical shifting arrangements or in any other suitable manner.

Further details of the bicycle gear shift indicator 10 are shown in FIGS. 4-7. For exemplary purposes, only exemplary features of the shift assembly 20 (e.g., the shift assembly 20 of the right brake assembly 14) is shown. However, the features shown and discussed herein are included in each of the shift assemblies 20.

As shown, the bicycle gear shift indicator 10 includes a shift sensor 30 and a controller 32. The shift sensor 30 is configured to detect a shifting operation of the shifters 24 and 26, which can also be referred to as first and second switches. The controller 32 is operatively coupled to the shift sensor 30 to determine a continuous shifting operation of each of the shifters 24 and 26 based on a gear shift selection signal from the shift sensor 30. As understood in the art, the controller 32 includes a central processing unit (CPU) and other conventional components such as an input interface circuit, an output interface circuit, and storage devices such as a ROM (Read Only Memory) device and a RAM (Random Access Memory) device. The controller 32 can be provided with various control programs that perform the operations discussed herein. It will be apparent to those skilled in the art from this disclosure that the precise structure and algorithms for the controller 32 can be any combination of hardware and software that will carry out the functions of the present invention.

In this example, the controller 32 is further operatively coupled to a derailleur, such as a front derailleur 22 or rear derailleur 24, to control the front derailleur 22 or rear derailleur 24 to perform shifting operations as understood in the art. The controller 32 can be operatively coupled to the front derailleur 22 or rear derailleur 24 wirelessly or via an electrical cable as understood in the art.

As further shown, the controller 32 is operatively coupled to a notification device 34. Thus, the controller 32 operates the notification device 34 to generate a shift notification corresponding to one or more gear shifts based on a continuous operation time of the shifter 26 or 28 as discussed herein. In particular, the controller 32 operates the notification device 34 to output the shift notification upon receiving a shift input signal from the shift sensor 30.

Figure 4:
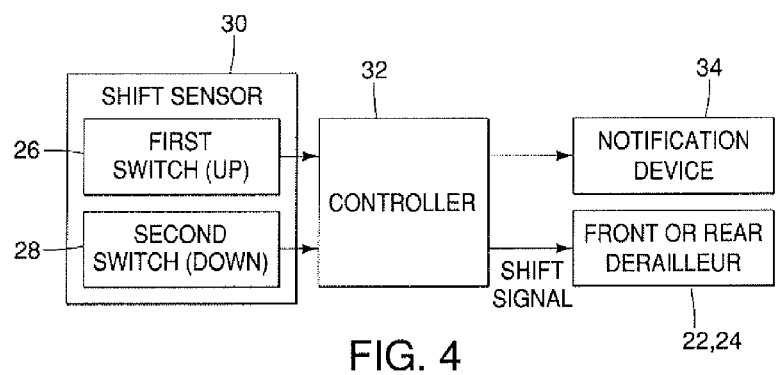
FIG. 4 is an exemplary block diagram of a bicycle gear shift indicator according to a disclosed embodiment.
Figure 5:
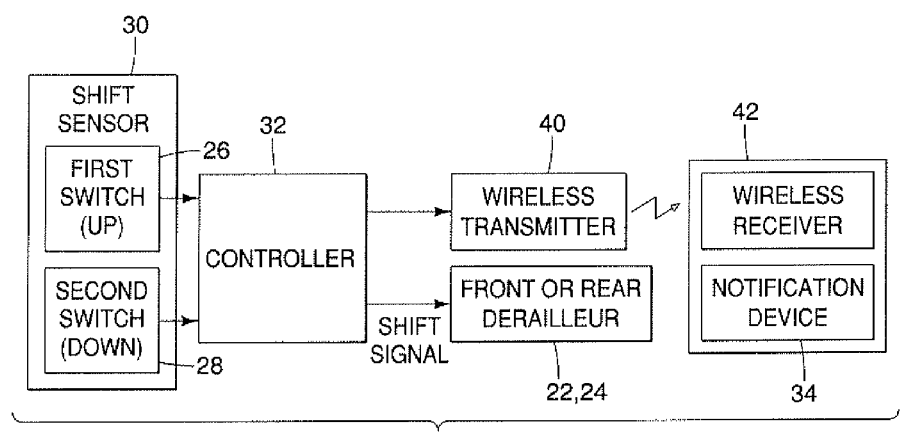
FIG. 5 is an exemplary block diagram of a bicycle gear shift indicator according to another disclosed embodiment.

As shown in the example of FIG. 4, the controller 30 can be coupled to the notification device 34 via an electrical cable or the like. Alternatively, as shown in the example of FIG. 5, the bicycle gear shift indicator 10 can include a wireless transmitter 40 operatively coupled to the controller 30, and a wireless receiver 42 operatively coupled to the notification device 34. Accordingly, the controller 30 can control the wireless transmitter 40 to send a control signal indicative of the gear shift selection signal to the wireless receiver 42 via the wireless transmitter 40 to operate the notification device 34.

Figure 6:
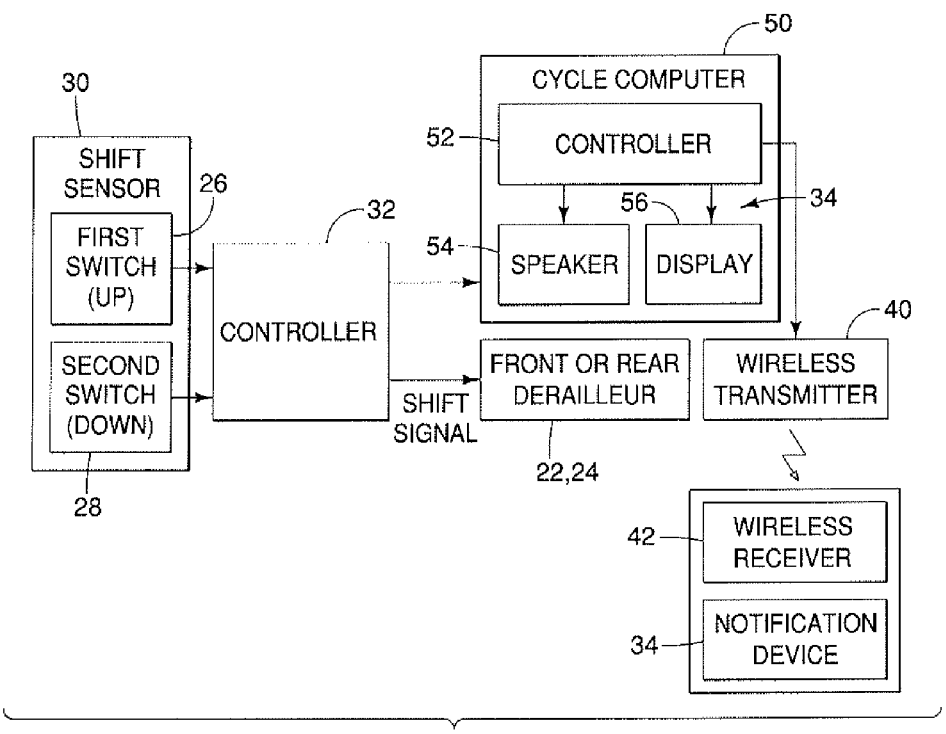
FIG. 6 is an exemplary block diagram of a bicycle gear shift indicator a further disclosed embodiment.

In addition, as shown in the example of FIG. 6, the bicycle gear shift indicator 10 can include or be operatively coupled to a cycle computer 50 which includes the notification device 34 or at least some components of the notification device 34. In this arrangement, the controller 30 is operatively coupled to the cycle computer 50 to send a control signal indicative of the gear shift selection signal to the cycle computer 50 to operate the notification device 34. The controller 32 can be operatively coupled to the cycle computer 50 wirelessly, via an electrical cable or in any other manner as understood in the art. For example, the controller 32 can be separate from a controller 52 of the cycle computer 50, or integrated with the controller 52. The controller 52 can include a central processing unit (CPU) and other conventional components similar to those of controller 30.

Figure 7:
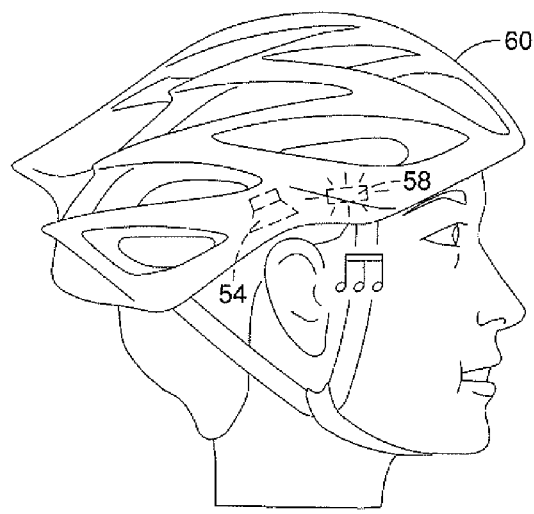
FIG. 7 illustrates an example of a bicycle helmet including components of a notification device of the bicycle gear shift indicator.

The notification device 34 can include a speaker 54, a display device 56 and a vibration device 58 (see FIGS. 1 and 7). For example, the speaker 54 and the display device 56 can be included in or operatively coupled to the cycle computer 50 as shown in FIG. 6. The controller 30 controls the display device 56 to display information corresponding to the gear shift selection signal.

Alternatively, the speaker 54 and the display device 56 can be in the notification devices 34, such as those shown in FIGS. 3 and 4, which are separate from the cycle computer 50. Basically, the speaker 54, the displace device 56 and the vibration device 58 can be disposed at any suitable location. For instance, as shown in FIGS. 1 through 3, the speaker 54, the display device 56 and the vibration device 58 can be disposed in the brake assemblies 16.

In addition as shown in FIG. 7, the notification device 34 or at least some components of the notification device 34 can be disposed in a helmet 60. The controller 32 can send a control signal indicative of the gear shift selection signal to the wireless receiver 42 of the notification device 34 via the wireless transmitter 40 to operate the notification device 34 as discussed above. The notification device 34 arranged in the helmet 60 can include, for example, the speaker 54 and the vibration device 58 as shown, but can also be configured to include a type of display device 56 such as a light positioned within the field of view of the rider to indicate that a shifting operation has occurred.

Figure 8:
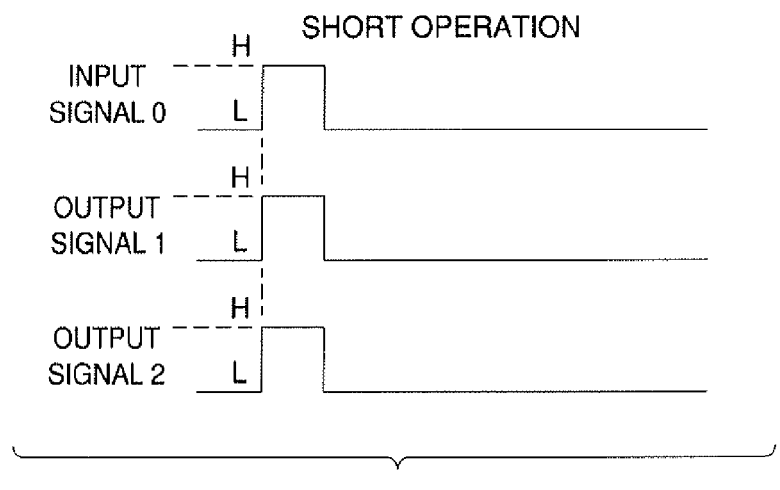
FIG. 8 is an exemplary timing diagram illustrating signals output by a shift sensor and a controller of the bicycle gear shift indicator.
Figure 9:
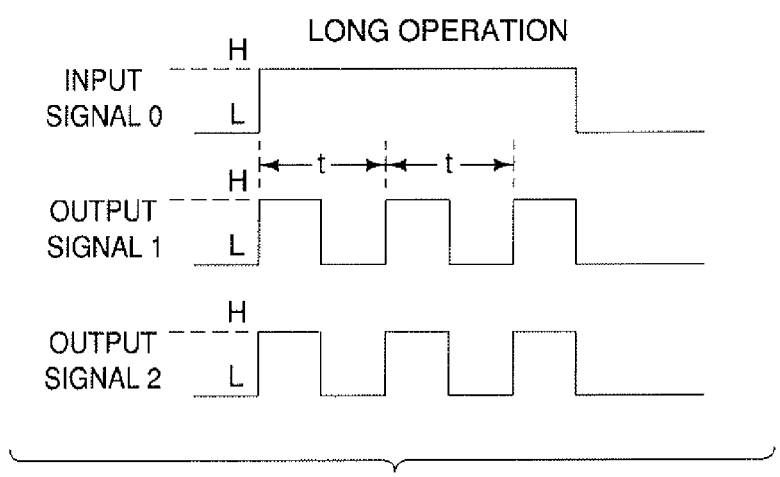
FIG. 9 is another exemplary timing diagram illustrating signals output by a shift sensor and a controller of the bicycle gear shift indicator.

Examples of operations of the bicycle gear shift indictor 10 will now be discussed with regard to FIGS. 8 through 17. As shown in FIG. 7, when one of the shifters 26 or 28 is actuated to perform a shifting operation, the shift sensor 30 outputs a gear shift selection signal as an input signal to the controller 32 as discussed above. For purposes of this discussion, it is assumed that shifter 26 has been actuated, and that the shifter 26 controls upshifting of the rear derailleur 24. The input signal can include, for example, a high state H that exists for a length of time corresponding to the length of time that the shifter 26 is actuated. For instance, as shown in FIG. 8, the shifter 26 is only actuated for a short period of time (e.g., less than one second). Therefore, the high state of the input signal exists only for a short period of time. However, as shown in FIG. 9, the shifter 26 is actuated for a long period of time (e.g., more than one second or several seconds). Therefore, the high state of the input signal exists for a long period of time.

Figure 10:
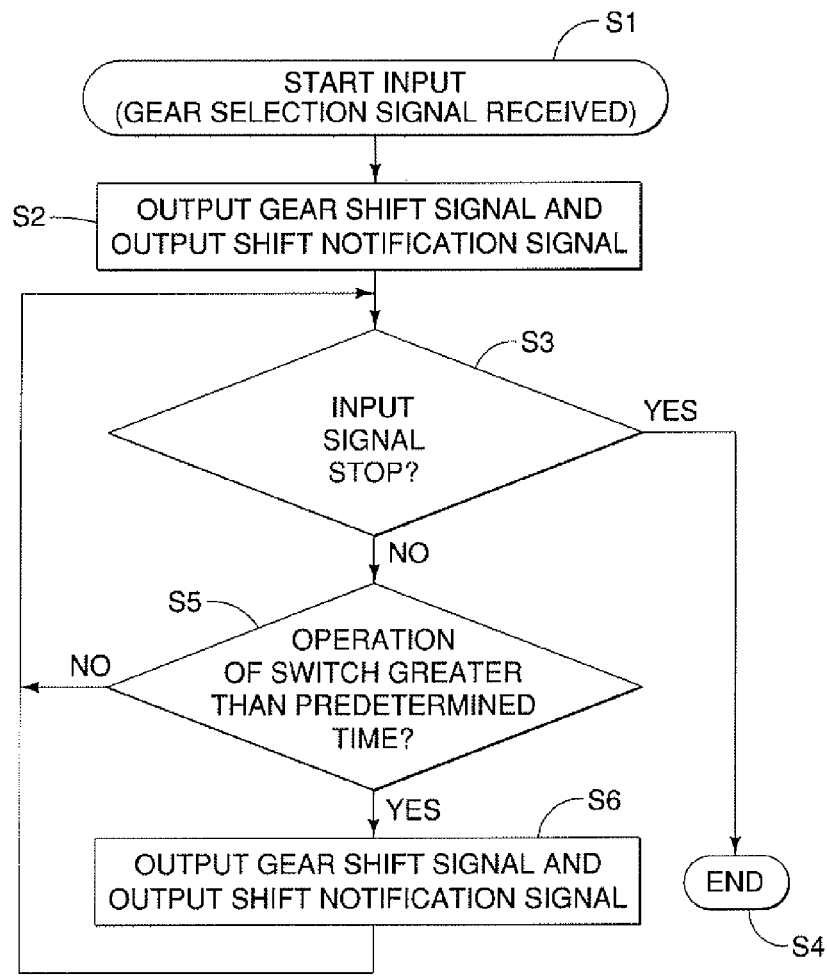
FIG. 10 is an exemplary flowchart illustrating operations performed by the controller of the bicycle gear shift indicator.

As shown in the flowchart of FIG. 10, when the controller 32 receives the gear shift selection signal (input signal) from the shill sensor 30 in step S1, the controller 32 outputs a gear shift signal and a shift notification signal in step S2. That is, as shown in FIG. 7, the controller 32 outputs a high state H of output signal 1 as the gear shift signal and a high state H of output signal 2 as the shift notification signal. In this example, the high states H for the output signals 1 and 2 can exist for a length of time sufficient to control the rear derailleur 22 and the notification device 34 as discussed herein.

For example, as shown in the table 70 of FIG. 11, when the controller 32 receives the gear shift selection signal (input signal) from the shift sensor 30 indicating that shifter 26 has been actuated, the controller 32 outputs the gear shift signal to control the rear derailleur 22 (i.e., a speed changing device) to perform a first up shift operation as understood in the art. Furthermore, the controller outputs the shift notification signal to control the notification device 34 to output the shift notification while the controller 32 outputs the gear shift signal to operate rear derailleur 22. Alternatively, the controller 32 can output the gear shift signal to operate the derailleur 22 (speed changing device), and then subsequently output the shift notification signal to control the notification device 34 to output the shift notification.

As can further be appreciated from FIG. 11, the controller 32 can control the notification device 34 to generate distinct sounds for each of the gear shifts based on the continuous operation of the shifter. For instance, for the first up shift operation, the controller 32 can control the notification device 34 to generate a tone from the speaker 54 corresponding to the note "DO" on a musical scale. Naturally, the controller 32 can also control the display device 56 to display an image (e.g., gear position) for the first up shift operation. Furthermore, the controller 32 can control the vibration device 58 to vibrate in response to the first up shift operation, and thus provide a tactile indication to a rider of the bicycle 12.

As further shown in the flowchart of FIG. 10, after performing the outputting operations in step S2, the controller 32 determines in step S3 whether the input signal has ceased. That is, the controller 32 determines whether the state of the input signal has gone from high H to low L. If the state of the input signal has gone from high H to low L, the controller 32 determines that the shifting operation has ended, and the processing ends in step S4.

However, if the state of the input signal remains high the controller 32 determines in step S5 whether the shifter 26 has been operated for longer than a predetermined time. For example, as shown in FIG. 9, the shifter 26 can be held in an actuated position for a long period of time (e.g., more than one second or several seconds) to perform multiple shift operations. If the controller 32 determines in step S5 that the shifter 26 has not been operated for longer than the predetermined time, the processing returns to step S3 and the controller 32 determines whether the input signal has gone from high H to low L (i.e., the shifting operation has ended).

The processing in steps S3 and S5 repeat until the input signal has gone from high H to low L or the controller 32 determines in step S5 that the shifter 26 has been operated for longer than the predetermined time. If the shifter 26 has been operated for longer than the predetermined time, the processing continues to step S6 and the controller 32 outputs another gear shift signal to control the rear derailleur 22 (i.e., a speed changing device) to perform a second up shift operation as understood in the art. Furthermore, the controller outputs the shift notification signal to control the notification device 34 to output the shift notification while the controller 32 outputs the gear shift signal to operate rear derailleur 22. Alternatively, the controller 32 can output the gear shift signal to operate the derailleur 22 (speed changing device), and then subsequently output the shift notification signal to control the notification device 34 to output the shift notification.

Accordingly, the controller 32 can control the notification device 34 to generate a tone from the speaker 54 corresponding to the note "RE" on a musical scale to indicate a second up shift operation as shown in FIG. 11. Naturally, the controller 32 can also control the display device 56 to display an image (e.g., gear position) for the second up shift operation. Furthermore, the controller 32 can control the vibration device 58 to vibrate in response to the second up shift operation, and thus provide a tactile indication to a rider of the bicycle 12.

Thus, the notification device 34 generates a first sound having a first sound characteristic and a second sound having a second sound characteristic upon the controller 32 determining that the gear shift selection signal indicates first and second sequential shift operations based on the continuous operation time of the shifter 26. In other words, the notification device 34 generates the first and second sounds, which are different, so that the first pitch corresponds to a first shift position and the second pitch corresponds to a second shift position that is different from the first shift position. For example, the notification device generates the first sound with a first pitch (e.g., "DO") as the first sound characteristic for indicating the first sequential shift operation and the second sound with a second pitch (e.g., "RE") as the second sound characteristic for indicating the second sequential shift operation. Also in this example, the notification device 34 generates the first and second sounds so that the second pitch is higher than the first pitch upon the controller 32 determining that the first and second sequential shift operations correspond to sequential upshift operations of the shifter 26. In addition, the notification device 34 can generate the first sound having a first sound pressure (e.g., volume) and the second sound having a second sound pressure (e.g., volume), such that the first and second sound pressures (volumes) are different. Thus, the first respective sound having the first pitch and the first volume can be the first sound characteristic, and the second respective sound having the second pitch and the second volume can be the second sound characteristic. Also, the first and second sounds can have the same tone or pitch, and can also have the same sound pressure (volume).

The processing in steps S3 and S5 thus repeat until the input signal has gone from high H to low L or the controller 32 determines in step S5 that the shifter 26 has been operated for longer than the predetermined time. If the shifter 26 has been operated for longer than the predetermined time, the processing continues to step S6 and the controller 32 outputs another gear shift signal as shown, for example, in FIG. 9, to control the rear derailleur 22 (i.e., a speed changing device) to perform a third up shift operation as understood in the art. Furthermore, the controller outputs the shift notification signal to control the notification device 34 to output the shift notification while the controller 32 outputs the gear shift signal to operate rear derailleur 22. Alternatively, the controller 32 can output the gear shift signal to operate the derailleur 22 (speed changing device), and then subsequently output the shift notification signal to control the notification device 34 to output the shift notification.

Thus, during this continuous movement of the shifter 26, the controller 32 controls the notification device 34 to generate a first sound having a first sound characteristic, a second sound having a second sound characteristic and a third sound having a third sound characteristic upon the controller 32 determining that the gear shift selection signal indicates three sequential shift operations in a single shifting direction from the continuous operation time of the shifter 26. As shown, for example, in FIG. 11, the first, second and third sound characteristics are different from each other.

For example, the controller 32 can control the notification device 34 to generate a tone from the speaker 54 corresponding to the note "MI" on a musical scale to indicate a third up shift operation as shown in FIG. 11. Also, the sound pressure or volume of the tone can be different than the sound pressure or volume of the "DO" and "MI" tones. Naturally, the controller 32 can also control the display device 56 to display an image (e.g., gear position) for the third up shift operation. Furthermore, the controller 32 can control the vibration device 58 to vibrate in response to the third up shift operation, and thus provide a tactile indication to a rider of the bicycle 12. Also, the first, second and third sounds can have the same tone or pitch, and can also have the same sound pressure (volume).

Once the controller 32 determines in step S6 that the shifting operation has ended, the process can stop and the controller 32 can wait for another gear shift selection signal.

It should also be noted that as shown in Tables 70, 80, 90 and 100 of FIGS. 11 through 14, the controller 32 can control have a particular sound assigned to each gear position, or can start over with the first sound tone or pitch (e.g., "DO") and first sound pressure level (volume) each time a new shifting operation occurs. For example, after the shifting operation shown in FIG. 8 or 9 has ended, the controller 32 waits for another gear shift selection signal.

When the controller 32 receives another gear shift selection signal from the shift sensor 30 indicating another shift operation that is nonsequential with the sequential shift operations discussed above, the controller 32 starts the process shown in FIG. 10 again. In doing so, the controller 32 controls the notification device 34 to generate a sound having a sound characteristic from the speaker 54 in the manner discussed above. The controller 32 can control the notification device 34 to generate a sound such as the first tone "DO" having a first sound pressure or volume as shown in Table 80 of FIG. 12. Alternatively, the controller 32 can generate a specific tone and volume representative of a particular gear position as shown in Tables 90 and 100 in FIGS. 13 and 14.

In addition, as shown in FIGS. 4 through 6, the controller 32 can receive a gear shift selection signal from another shifter, such as shifter 28, which is used to perform a downshifting operation. When this occurs, the controller 32 performs the operations shown in FIG. 10 and discussed above to control the notification device 34 to generate the notifications, such as the sounds having the particular tones and volumes, as well as the displays and vibrations as discussed above. As shown in Table 70 of FIG. 11, the notification device 34 can generate the tone "DO" for the first downshifting operation, and continue down the scale (e.g., "TI," "RA" and so on) for the subsequent sequential shifting operations. Furthermore, for subsequent nonsequential shifting operations, the controller 32 can assign a particular tone and volume for each gear position, or can begin over with the tone "DO" or any other suitable tone as discussed above with regard to the upshifting operations. Thus, the sound characteristic for the first upshift operation and the sound characteristic for the first downshift operation can be the same.

Figure 15:
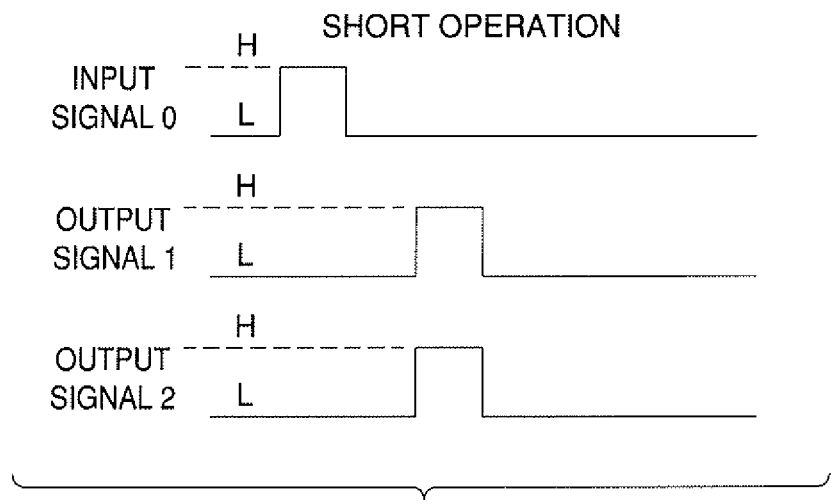
FIG. 15 is a further exemplary timing diagram illustrating signals output by a shift sensor and a controller of the bicycle gear shift indicator.
Figure 16:
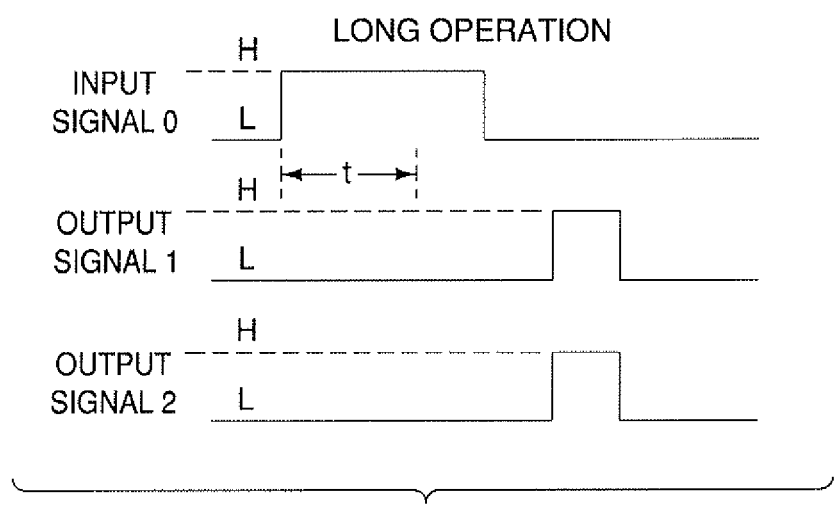
FIG. 16 is still another exemplary timing diagram illustrating signals output by a shift sensor and a controller of the bicycle gear shift indicator.
Figure 17:
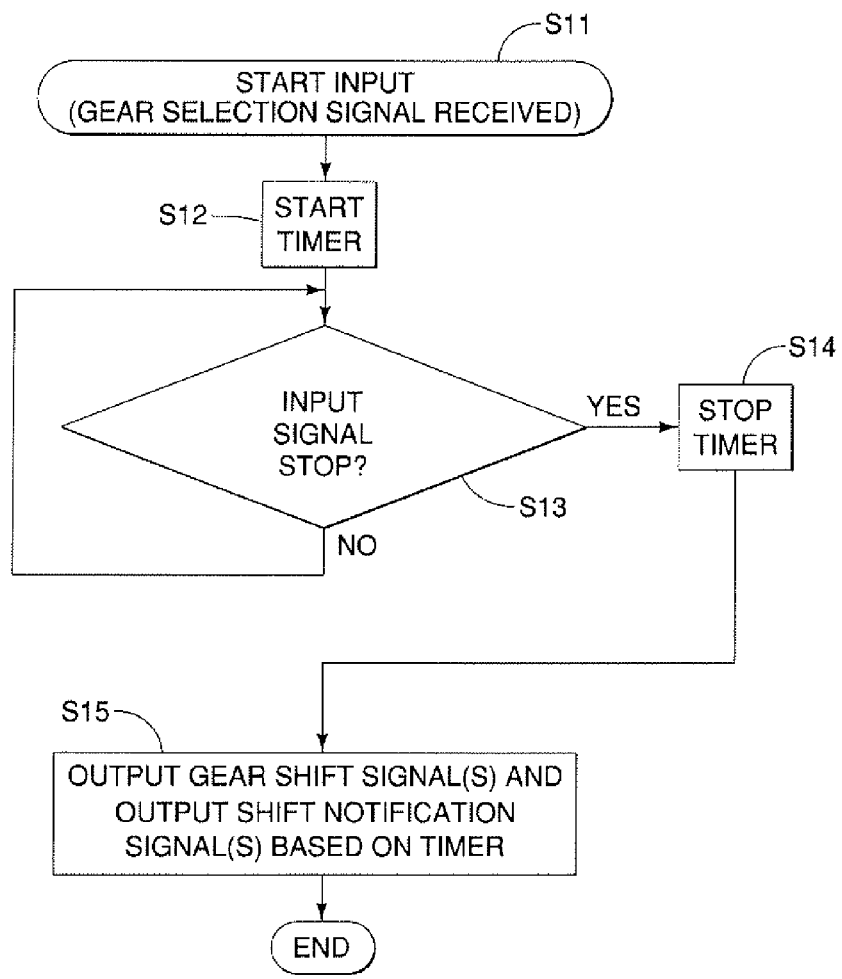
FIG. 17 is another exemplary flowchart illustrating operations performed by the controller of the bicycle gear shift indicator.

As shown in FIGS. 15 through 17, the controller 32 can also be configured to operate in different manners in response to a gear shift selection signal. For example, as shown in FIGS. 15 and 16, when one of the shifters 26 or 28 is actuated to perform a shifting operation, the shift sensor 30 outputs the gear shift selection signal as an input signal to the controller 32 as discussed above. As shown in FIG. 15, the shifter 26 is only actuated for a short period of time (e.g., less than one second) in a manner similar to that shown in FIG. 8. Therefore, the high state of the input signal exists only for a short period of time. However, as shown in FIG. 16, the shifter 26 is actuated for a long period of time (e.g., more than one second or several seconds) in a manner similar to that shown in FIG. 9. Therefore, the high state of the input signal exists for a long period of time.

As shown in the flowchart of FIG. 17, when the controller 32 receives the gear shift selection signal (input signal) from the shift sensor 30 in step S11, the controller 32 starts a timer in step S12. The controller 32 then determines in step S13 whether the gear shill selection signal has stopped (e.g., has gone from high H to low L). When the controller 32 determines that the gear shift selection signal has stopped, the controller stops the timer in step S4, and outputs a gear shift signal and a shift notification signal in step S5. That is, as shown in FIGS. 15 and 16, the controller 32 outputs a high state H of output signal 1 as the gear shift signal and a high state H of output signal 2 as the shift notification signal. In this example, the high states H for the output signals 1 and 2 can exist for a length of time sufficient to control the rear derailleur 22 and the notification device 34 as discussed herein.

Accordingly, in this example, the controller 32 outputs one high state for output signals 1 and 2 regardless of how long the shifter 26 was actuated. Thus, as shown in the table 70 of FIG. 11, when the controller 32 receives the gear shift selection signal (input signal) from the shift sensor 30 indicating that shifter 26 has been actuated, the controller 32 outputs the gear shill signal to control the rear derailleur 22 (i.e., a speed changing device) to perform a first up shift operation as understood in the art. Furthermore, the controller outputs the shift notification signal to control the notification device 34 to output the shift notification while the controller 32 outputs the gear shift signal to operate rear derailleur 22. Alternatively, the controller 32 can output the gear shift signal to operate the derailleur 22 (speed changing device), and then subsequently output the shift notification signal to control the notification device 34 to output the shift notification.

Accordingly, the controller 32 can control the notification device 34 to generate distinct sounds for each of the gear shifts based on the operation of the shifter 26 as discussed above. For instance, for the first up shift operation, the controller 32 can control the notification device 34 to generate a tone from the speaker 54 corresponding to the note "DO" on a musical scale. Naturally, the controller 32 can also control the display device 56 to display an image (e.g., gear position) for the first up shift operation. Furthermore, the controller 32 can control the vibration device 58 to vibrate in response to the first up shift operation, and thus provide a tactile indication to a rider of the bicycle 12.

In addition, the controller 32 can control the notification device 34 to provide the notifications for shifting operations as discussed above with regard to FIGS. 11 through 14. The controller 32 can also control the notification device 344 to provide the notifications for other shifting operations, such as downshifting operations performed by shifter 28 as discussed above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle gear shift indicator comprising:
   a shift sensor configured to detect a shifting operation of a shifter; and
   a controller operatively coupled to the shift sensor to determine a continuous shifting operation of the shifter based on a gear shift selection signal from the shift sensor, the continuous shifting operation of the shifter enabling one or more gear shifting operations depending on a length of time of the continuous shifting operation,
   the controller being configured to operate a notification device that generates a shift notification corresponding to one or more gear shifts based on the length of time of the continuous operation time of the shifter.

2. The bicycle gear shift indicator according to claim 1, wherein
   the controller operates the notification device to output the shift notification upon receiving a shift input signal from the shift sensor.

3. The bicycle gear shift indicator according to claim 1, wherein
   the controller operates the notification device to output the shift notification while the controller outputs a gear shift signal to operate a speed changing device.

4. The bicycle gear shift indicator according to claim 1, wherein
   the controller outputs a gear shift signal to operate a speed changing device, and then subsequently operates the notification device to output the shift notification.

5. The bicycle gear shift indicator according to claim 1, wherein
   the notification device includes a speaker.

6. The bicycle gear shift indicator according to claim 1, wherein
   the notification device includes a vibration device.

7. The bicycle gear shift indicator according to claim 1, wherein
   the notification device includes a display device.

8. The bicycle gear shift indicator according to claim 1, further comprising
   a wireless receiver operatively coupled to the notification device; and
   a wireless transmitter operatively coupled to the controller, the controller being configured to send a control signal indicative of the gear shift selection signal to the wireless receiver via the wireless transmitter to operate the notification device.

9. The bicycle gear shift indicator according to claim 1, further comprising
   a cycle computer including the notification device, the controller being configured to send a control signal indicative of the gear shift selection signal to the cycle computer to operate the notification device.

10. The bicycle gear shift indicator according to claim 9, wherein
    the cycle computer further includes a display as the notification device, which is configured to display information corresponding to the gear shift selection signal.

11. The bicycle gear shift indicator according to claim 1, wherein
    the controller is further configured output a control signal indicative of the gear shift selection signal to control a derailleur in accordance with the gear shift selection signal.

12. The bicycle gear shift indicator according to claim 1, wherein
    the controller is configured to operate the notification device to generate distinct sounds for each of the gear shifts based on the continuous operation of the shifter.

13. The bicycle gear shift indicator according to claim 12, wherein
    the notification device generates a first sound having a first sound characteristic and a second sound having a second sound characteristic upon the controller determining that the gear shift selection signal indicates first and second sequential shift operations based on the continuous operation time of the shifter.

14. The bicycle gear shift indicator according to claim 13, wherein
    the notification device generates the first sound with a first pitch as the first sound characteristic for indicating the first sequential shift operation and the second sound with a second pitch as the second sound characteristic for indicating the second sequential shift operation.

15. The bicycle gear shift indicator according to claim 13, wherein
    the notification device generates the first and second sounds so that the second pitch is higher than the first pitch upon the controller determining that the first and second sequential shift operations correspond to sequential upshift operations of the shifter.

16. The bicycle gear shift indicator according to claim 13, wherein
    the notification device generates the first and second sounds, which are different, so that the first pitch corresponds to a first shift position and the second pitch corresponds to a second shift position that is different from the first shift position.

17. The bicycle gear shift indicator according to claim 12, wherein
    the notification device generates a first sound having a first sound characteristic, a second sound having a second sound characteristic and a third sound having a third sound characteristic upon the controller determining that the gear shift selection signal indicates three sequential shift operations in a single shifting direction from the continuous operation time of the shifter, the first, second and third sound characteristics being different from each other.

18. The bicycle gear shift indicator according to claim 12, wherein
    the notification device generates a first sound having a first sound pressure and a second sound having a second sound pressure, the first and second sound pressures being different.

19. The bicycle gear shift indicator according to claim 12, wherein the notification device generates a first sound having a first volume and a second sound having a second volume, the first and second volumes being different.

\* \* \* \* \*